April 28, 1936. S. MUSHER 2,038,752
INHIBITOR FOR PACKAGED PRODUCTS
Filed March 29, 1935
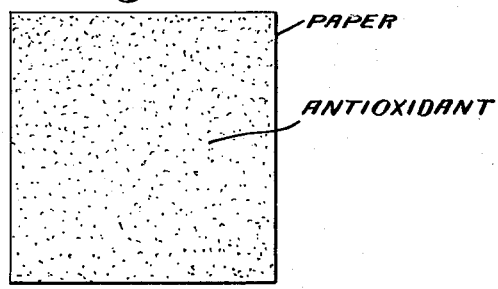
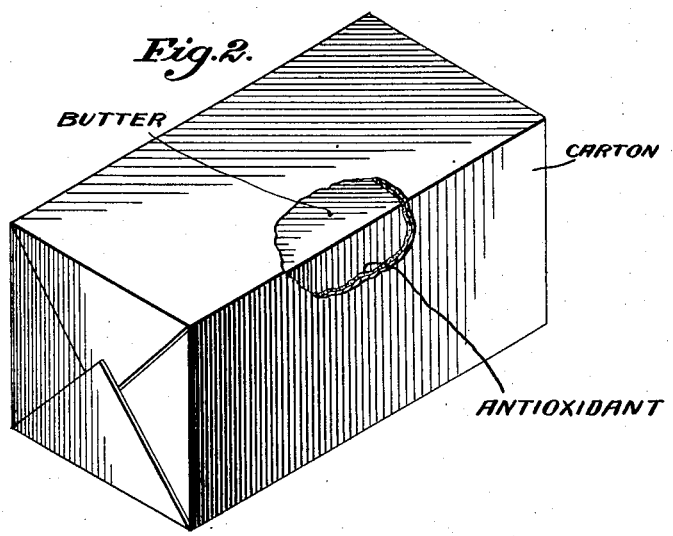
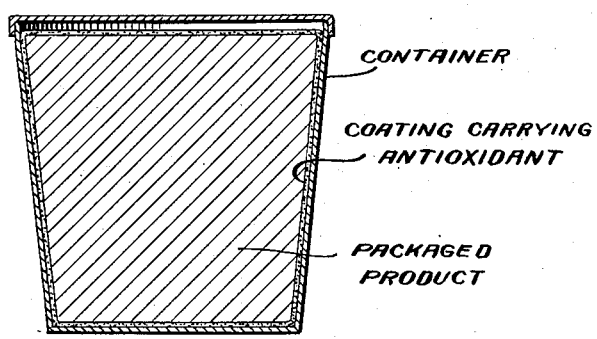

Patented Apr. 28, 1936

2,038,752

UNITED STATES PATENT OFFICE 2,038,752

INHIBITOR FOR PACKAGED PRODUCTS

Sidney Musher, New York, N. Y., assignor to Musher Foundation Incorporated, New York, N. Y., a corporation of New York Application March 29, 1935, Serial No. 13,743

8 Claims. (Cl. 99—171)

This invention relates to antioxidants and particularly to the utilization of antioxidants or substances exhibiting marked antioxidative activity in connection with packaging materials used for the packing of such products as are subject to oxidation.

In the prior art attempts have been made to utilize various forms of antioxidants for addition to food products in order to inhibit deterioration. The difficulties incident to the addition of such products by reason of labeling requirements and mechanical operations have to a considerable extent prevented the adoption of the use of antioxidants for food products.

The present invention is accordingly concerned with the utilization of antioxygenic substances in connection with packaging materials, passing on such antioxygenic activity to the products packed.

Other objects include the utilization of antioxidative substances by relatively simple and inexpensive means.

Still further objects and advantages of the present invention will appear from the more detailed description set forth below, it being understood, however, that this more detailed description is given by way of illustration and explanation only, and not by way of limitation, since various changes therein may be made by those skilled in the art without departing from the scope and spirit of the present invention.

In specification, Serial No. 696,915, filed November 6, 1933, entitled "Stable food products", there is described and claimed the protection of glyceride oil bearing materials, primarily, including oils and fats and mixtures thereof, against oxidative changes, such as those which result in rancidity, by the use of sesame products. Sesame seed is particularly set forth and claimed therein for that purpose, utilizing the sesame seed in any desirable form, such as a flour or pulverized material, or by way of extracts produced from such sesame material and incorporated with the glyceride oil and fat, or similar product. In that specification, crushed sesame seed without segregation of oil from the cake may be incorporated with the oil and/or fat to impart thereto remarkable improved keeping qualities, making the resulting product substantially resistant to development of rancidity, and markedly changing the flavor and odor and other desirable characteristics of the product. As illustrative of such treatment as given in that specification, the crushed sesame seed may be permitted to remain with the oil treated, or after relatively short treatment, such as for 15 minutes at moderate temperatures, for example, 150° C., the sesame seed fibers may be filtered off, or otherwise removed from the treated oil, the latter exhibiting marked keeping qualities, modified flavor and odor, and yielding at the same time a seed cake of valuable edible characteristics, not alone for the ordinary purposes for which seed cakes are employed, but also because of the manner of treatment, available for human consumption. The sesame seed in ground condition retaining the oil with the seed fiber may be added to the desired oil and/or fat in the amount of from 5 to 10%, for example, and in most cases not exceeding 20%, although, of course, higher quantities may be utilized if desired. The wide variety of oils and fats are referred to as utilizable in accordance with the treatments set forth in that specification, including the various animal and vegetable oils, both in refined and unrefined condition, and including such products as lard, tallow, oleo stearin, hydrogenated derivatives, such as solid products, etc., paint oils, etc. Such treated oils and fats very markedly increase their resistance to the development of rancidity and show a marked decrease in the development of fatty acid content on standing, exhibit improved taste and odor, and show a far greater stabilization of color which occurs co-existent with stabilization against development of rancidity, and which is of importance to the paint industry as well as from an edible standpoint, so that actually by such treatments as set forth in that prior specification, there are produced novel types of oils and fats or mixtures thereof.

In specification, Serial No. 698,543, filed November 17, 1933, for "Fats and oils", there is particularly described and claimed the utilization of other oil containing seeds and nuts than sesame products for the protection of the glyceride oils and fats or mixtures containing the same against development of rancidity, such materials being utilized in a manner analogous to that set forth in connection with the sesame products, and being permitted to remain in the products themselves, or when desired, removed therefrom. The methods of treatment may be by direct infusion as set forth above, or by utilizing solvent extracted components, either by means of volatile solvents or the glyceride oil extracts themselves, from such seed and oil products. Among the nut, seed and fruit products which may be utilized in protecting such glyceride materials against development of rancidity, or other aging changes, there is particularly set forth the use of peanuts, sunflower seed, cottonseed, linseed, cocoanut, etc.

utilized in the protection of a wide variety of oils and fats, both animal and vegetable, such as those named above. As there pointed out, instead of direct infusion methods, other methods of making extracts of the desirable constituents exhibiting antioxidative activity, from the seeds, nuts or fruits may be utilized as, for example, by the treatment of the crushed seeds, etc. by volatile or other solvents which are then incorporated with the desired oils and/or fats.

In specification, Serial No. 710,727, filed February 10, 1934, entitled "Products from fats and oils and methods of making same", there is particularly described and claimed the protection of glyceride containing materials, such as fats and oils, or mixtures, thereof, or materials containing the same, against oxidative changes, such as development of rancidity, by the utilization of non-oil bearing vegetative matter, such non-oil bearing vegetative matter being materials which either contain no oil whatsoever, or only such minor quantities of oil that they do not serve as a source of oil for commercial or industrial use. The materials illustrated therein as non-oil bearing substances that may be employed include oats, rye, barley, hominy, alfalfa, and flours, such as bleached flour and other forms of cereals, as well as ordinary leaves, or even such products as twigs. These non-oil bearing vegetative matters are employed in the manner set forth above for the sesame products, and may be utilized by direct infusion, or the glyceride fat or oil containing materials to protect them against development of rancidity, either with or without removal of the fibers of the products subsequently, or solvent extracted portions of such non-oil bearing vegetative materials may be utilized for protection of the glyceride materials against development of rancidity. In addition to the materials specifically set forth above as utilizable as a source of antiexidant material, other examples of non-oil containing vegetative materials given therein include oat meal, both cooked and uncooked, finely ground rice flour, potato flour, and ordinary bleached wheat flour. As there pointed out, the method of direct infusion may be utilized, but other methods of making extracts of the desirable constituents may be utilized, as for example, by the treatment of the non-oil bearing vegetative matter by volatile or other solvents, which are then incorporated with the desired oils and/or fats, and the solvents usually subsequently eliminated. In such cases where volatile solvents are employed, the effect on flavor, aroma and taste in the final product is not as marked as when the direct infusion methods are employed. Flavor, for example, may be lost for the simple reason that removal of the volatile solvent ultimately also removes the flavor and aroma yielding substances as a general rule. Among solvents which are mentioned that may be utilized in the extraction of desired non-oil bearing vegetative materials there are specifically set forth hydrocarbons, acetone, carbon tetrachloride, and other substances of relatively high volatilization value. The antioxidative substances may be utilized in connection with the protection of both edible and nonedible substances against development of oxidative or aging changing of undesirable characteristics.

In specification, Serial No. 733,517, filed July 2, 1934, entitled "Foodstuffs", there is particularly described and claimed the utilization of soya bean products in protecting the glyceride materials against development of oxidative changes such as rancidity, the soya bean material being utilizable in any desired form, either in the form of the whole soya bean material, or a flour made therefrom, or the soya bean cake, as is obtained from expeller or extraction apparatus, for example, in removing most of the fat content of such soya beans, etc.; the manner of use of the soya bean product being similar to that described above in connection with the sesame material, namely, either by direct infusion processes, or by the inclusion of solvent extracted components of the soya bean material incorporated with the glyceride material to be protected against development of rancidity. Here again, while direct infusion of the desired fat or oil with the soya bean material is particularly set forth, there are also described extractions of the soya bean material with solvents, including volatile solvents and their utilization for incorporation with the desired fat or oil whether animal or of other character. While as therein stated the various vegetable and animal oils and fats and other oil containing products of glyceride character may be utilized for treatment to protect them against development of rancidity, non-edible substances may also be treated, as well as other substances not necessarily dependent on glyceride oil contents, including, for example, coffee, tobacco, etc. And while soya bean material has been particularly emphasized and claimed therein, analogous types of materials including, for example, oat meal, corn germs, corn cake, whole wheat, castor bean pumice, maple tree leaves, etc. may be utilized as a source of the antioxidant activity or substance.

In specification, Serial No. 799, filed January 7, 1935, entitled "Antioxidants", there is particularly described and claimed the utilization of these vegetative materials, as set forth above, including both the oil containing and non-oil containing substances, and extracts derived from them, in the protection of various types of materials other than the oil or fat containing substances, against oxidative or aging changes. As illustrative of the oil bearing materials utilized as a source of the antioxidant protectants, various oil bearing nuts, seeds, and fruits are referred to including, for example, sesame seed, peanuts, sunflower seed, cottonseed, poppy seed, linseed, cocoanuts, soya bean, castor bean, etc., whereas illustrating the non-oil bearing or substantially non-oil bearing vegetative matters that may be utilized are the various cereals and grains, etc., including oats, wheat, rye, barley, hominy, corn, alfalfa, and their various products such as the flours, bleached or unbleached, and other forms of the grains and cereals, as well as such vegetative materials as ordinary leaves, such as maple tree leaves, and even twigs. Various forms of these products, as noted, may be employed. Illustrating such types of products, for example, there may be utilized the dry, ground soya bean material or the soya bean cake from which the oil has been expelled, or the highly refined bleached soya bean flour, or the soya bean material in almost any type of form. As set forth in that specification, these various products may be utilized in treating and protecting various types of substances including milk powders, chocolate or other flavored milk products, etc., cheeses, fruit juices, cocoanut juice, egg products, including egg whites and egg yolks, cod livers and oils, coffee and coffee products, yeasts, rubber and rubber compositions, mineral oils and mineral oil distillates including gasoline, lubricating oils, mineral oils, etc., leather, linoleum, paper, textiles, etc. As there pointed out, the utilization of materials for development of antioxidative activity or exhibiting such functions, are not dependent on vitamin E content, nor on the utilization of materials of high moisture content, but the substances are primarily utilized which are of relatively low moisture content, or in many instances practically free from moisture, such vegetative materials nevertheless exhibiting high antioxidative activity. Direct infusion or treatment methods are particularly referred to. Where the fruit juices such as the citrus fruit juices, including orange juice, lemon juice, grape fruit juice, and other juices, such as cocoanut juice, are employed, or liquid milk products, or the mineral oil and mineral oil distillates, including gasoline, lubricating oils, mineral oils, etc. are directly treated with the vegetative material serving as a source of antioxidative material, extracts of said materials may be said to be produced, particularly because in most instances, pronounced antioxidative activity is still retained in the treated products, even though the fibers of the vegetative substances are removed after the direct treatment of the product to be protected.

In specification, Serial No. 3876, filed January 28, 1935, entitled "Prevention of oxidation", the utilization of these various vegetative materials in protecting solid or substantially solid products, particularly when in the form of discrete masses, against development of oxidative or aging changes, is particularly described and claimed. For such purposes the vegetative materials of both the oil containing seeds, nuts and fruits, or derivatives of them, and the substantially non-oil containing vegetative materials, such as cereals and grains, as more particularly described above, may be utilized in the protection of various types of solid products, such as nuts, coffee, oat flakes, cheeses, milk powders, and other milk products, non-edible solid substances, such as rubber, resins, soaps greases, etc., and drugs, chemicals and pharmaceuticals may be treated in accordance with that invention. In that specification the invention particularly claimed is the utilization of the vegetative materials in substantially dry condition.

In specification, Serial No. 8411, filed February 26, 1935, entitled "Antioxidant extracts", reference is made to the utilization of the extracts particularly in volatile media for the protection of substances both edible and inedible and both glyceride containing and non-glyceride containing against the undesired oxidation and aging changes.

Although it is recognized, for instance, by means of the foregoing specifications that such a material as oat flour or the extract of oat flour may substantially inhibit the development of rancidity when incorporated into the mass of the product, yet the addition of that foreign substance to butter would not be permitted by reason of the fact that the definition for butter is determined by law and not even if it were to be declared upon the label would a foreign substance like this be permitted for use.

In addition, there are many other food products in which the addition of any antioxidant would be prohibited because of the labeling requirements or because the product would change in color or flavor or other charactistics following the addition of such antioxidant.

Soya bean flour, for instance, when added to lard will give it a deep yellow color and will not permit that lard to be used for deep fat frying. Even the concentrate from soya bean flour will require changes in labeling to permit its use even to the extent of .1% to .5%.

By this invention and by the incorporation of antioxidants into the packaging materials it is possible to avoid the addition of an antioxidant to the product to be protected while substantially protecting that product against oxidation.

By means of this process all the undesirable features of adding foreign materials requiring changes in labeling or changes in physical characteristics are eliminated and to a substantial degree the product is protected against oxidation even though the antioxidant is not directly mixed with it.

In the accompanying drawing there is shown in—

Figure 1 a plan view of a paper product carrying an antioxidant on the surface thereof; in Figure 2 a perspective view of a carton of a food product like butter, the wrapper of which carries an antioxidant on the surface exposed to and in contact with the food product in the carton; and in—

Figure 3 is a vertical section through a pail or bucket carrying a food product with the inner walls of the pail or bucket carrying an antioxidant containing coating.

As an instance of the carrying out of this invention let us take the example of lard packed in parchment paper. During the manufacture of that paper a product like oat flour or soya bean flour or their extracts or any other type of material which would be antioxygenic as regards lard could be sprayed upon the surface of that paper in order to expose a direct film to the surface of the lard after packaging. It may be that the antioxidant could be dusted upon the surface of the paper before it has been thoroughly dried and while still in the process of manufacture. It may be that the antioxidant could be mixed with the entire paper mass or that it become veritably a part of the paper itself. It may furthermore be that the antioxidant could be added to an inert material like paraffin and this combined material be used to spray upon the paper as in the manufacture of a wax paper in order to expose the antioxidant to the surface of the food product to be finally packaged. In the event that paraffin is not used and that the antioxidant is merely dusted upon the surface of the paper, that paper may be run between rollers in order to flatten down the exposed portion of the antioxidant and to put it into a solid mass form.

The specially treated paper so manufactured could be used as a covering for lard, margarine, butter, cheese, frozen cream, frozen mackerel, frozen strawberries and a wide variety of other products which are normally subject to oxidative changes.

The protection given at the surface of the product will without the addition of any foreign substance to the product itself extend substantia lly the life of that product as will be easily evident. Ordinary bleached lard when packed in parchment paper and when kept under normal refrigeration will generally keep for about four weeks before reaching a peroxide value of 20 which is considered the rancid point. The same lard packed in parchment paper previously protected by the use of soya bean flour dusted upon the surface of that paper will keep for approximately three months under the same conditions before reaching the same rancid point.

In the case of such food products as butter, cheese, margarine, fish, and similar materials packed in wooden pails, the process is similarly applicable. For these wooden pails a covering of wax is generally used. The wax may be mixed mechanically with the antioxidant in order to expose the antioxidant to the surface of the food product but it is preferable to dust the antioxidant upon the surface of the wax before that wax is thoroughly dry upon the pail. It is evident that if the antioxidant is mixed with the entire amount of wax, a much larger percentage of the antioxidant will have to be used in order to give protection to the food product than if a dusting upon the surface of the wax were to be made.

In the case of such food products as salad oil, shortening, or lard packed in barrels and where paraffin is but infrequently used, the antioxidant may be mixed with the silicate or it may be dusted upon the surface of the silicated barrel before it has thoroughly dried on the inner surface of the barrel in order to give protection to the food products which are to be packed in those barrels.

These methods of packaging are illustrated in the drawing attached hereto. In that drawing, as shown in Figure 1, a portion of paper, which desirably may be parchment paper, carries a surface coating of antioxidant, which may be any of the antioxidant materials referred to above, or other desirable antioxidant substances. Such paper carrying the antioxidant may be utilized for wrapping various types of substances or materials subject to oxidative changes, and when encased or wrapped in such paper, oxidative changes in such materials will be inhibited in accordance with the present invention. Or as shown in Figure 2, the butter or similar products packaged in cartons may have the carton made from paper carrying antioxidant as a liner therein, so that the antioxidant is in contact with the material that is to be protected against oxidative changes. A further form of the invention is specifically illustrated in Figure 3 for illustrative purposes, where as explained hereinabove, a pail or bucket in which various shortenings or other types of materials is packaged, is protected against oxidative changes by a coating on the inner walls of the pail or bucket or similar container, which coating carries antioxidant, and inhibits oxidative changes in the materials packaged therein. The cover is also shown as having a lining carrying antioxidant material.

In the entire can making industry this process has application since the antioxidant may actually be mixed with the lacquer and baked on the tin just as the lacquer would normally be baked upon the tin. On the other hand, after the lacquer has been placed upon the tin a second layer of a more concentrate solution of lacquer plus the antioxidant can be used as a coverage for the tin in order to expose a greater surface of the antioxidant to the food product.

The antioxidant may be mixed with the lacquer or other carrying agent in order to permit it to adhere to the surface of the tin merely for the purpose of allowing the antioxidant to remain in contact with the food product packaged in that tin so that the presence of the lacquer would become secondary to the presence of the antioxidant itself.

The cans so treated will be particularly beneficial for the packaging of citrus fruit juices, evaporated milk, and a wide variety of other food products normally subject to quick deterioration from oxidation.

By reason of this process food products are generally protected against oxidation by the presence of inhibitors in the packaging material so that contact is allowed between the packaging material and the product to be protected.

This invention relates broadly to the use of antioxidants with the packaging material. It should not be limited to the specific use of the antioxidants mentioned but rather covers the entire antioxidant field and protection should be given to any antioxidants incorporated with packaging material for the purpose of protecting the products subsequently packed in it.

The antioxidant may not only be incorporated with the packaging material but it may as well be incorporated with a colloid or emulsifying agent which although of itself requiring no protection against oxidation will nevertheless give protection to the particles which it surrounds as in emulsified form. For instance, in the manufacture of mayonnaise the particles of oil are the discontinuous phase and the aqueous material comprising the continuous phase with a thin film of egg yolk at the surface of each particle of oil, which egg yolk is the emulsifying agent. It has been found that the addition of an antioxidant to the oil will not be nearly as effective as the addition of the same amount of antioxidant to the egg yolk which surrounds the particles of oil. If a mayonnaise, for instance, contains 80% of oil and to this 80% of oil 10%, or as against the total body of that mayonnaise, 8% of oat flour were to be added, such addition being made directly to the oil, necessarily some protection against oxidation of the oil would be given. If, however, the same 8% of oat flour were to be added directly to the egg yolk, which in that same mayonnaise, would exist to the extent of 8%, thereby requiring a mixture of half egg yolk and half oat flour, the oil in the mayonnaise would be given at least three times as much protection as if the same percentage of oat flour had been added to the oil itself.

In the case of an ordinary emulsion wherein no colloid or emulsifying agent were to be used, the emulsion merely consisting of a continuous and discontinuous phase, the antioxidant should be added directly to the continuous phase in order to give protection to the discontinuous phase. It is understood in all these cases that it is the discontinuous phase which requires protection.

It has been found, for instance, that although oat flour is an antioxidant when added to lard, nevertheless a soda cracker made with lard containing oat flour will not keep materially longer than the same kind of soda cracker made with untreated lard. Even if as much as 10% of oat flour were to be added to the soda cracker and mixed into the dough, little protection would be given. However, if as little as 2% of oat flour is dusted upon the surface of that cracker either after it has been baked or before it has gone into the oven, substantial protection against oxidation will be given.

If, of course, the flour used in that cracker were to be thoroughly impregnated with the extract of oat flour to the extent that sufficient of this extract were used so as to give protection to the entire finished cracker, direct benefits would be obtained. The antioxidant thus added to the flour would inhibit the development of staleness in that flour whether it is used for crackers, bread, or for any of the manifold purposes to which flour may be put.

It is noteworthy that the antioxidants so mixed with a nonoxidative material may protect a material subject to oxidation with which it comes in contact.

Having thus set forth my invention, I claim:

1. A flexible packaging material in sheet form carrying with a vegetative antioxidant material selected from the group of cereals and grains and oil-containing seeds, nuts and fruits.

2. A flexible packaging material in sheet form having at its exposed surfaces an antioxidant selected from the group consisting of cereals and grains capable of protecting products in contact with its surfaces against oxidation.

3. A product comprising parchment paper carrying an antioxidant material selected from the group of cereals and grains and oil-containing seeds, nuts and fruits.

4. A method for preventing oxidation of food products comprising encasing such food products in a flexible packaging material having at its surface an antioxidant material selected from the group consisting of cereals and grains and oil-containing seeds, nuts and fruits.

5. The process of inhibiting oxidation of food products which comprises packing such food products in a flexible packaging material having an antioxygenic vegetative material selected from the group consisting of the cereals and grains at its exposed surfaces.

6. A flexible packaging material in sheet form intimately incorporated with an antioxidant material selected from the group consisting of the cereals and grains.

7. A product comprising waxed paper carrying an antioxidant material selected from the group consisting of cereals and grains and oil-containing seeds, nuts and fruits.

8. A flexible packaging material in sheet form intimately incorporated with a vegetative antioxidant material selected from the group containing oil-containing seeds, nuts and fruits.

SIDNEY MUSHER.